United States Patent [19]
Kato et al.

[11] Patent Number: 4,668,157
[45] Date of Patent: May 26, 1987

[54] INDUSTRIAL ROBOT SYSTEM

[75] Inventors: Hisao Kato; Akira Sato, both of Aichi, Japan

[73] Assignee: Mitsubishi Denki Kabushiki Kaisha, Tokyo, Japan

[21] Appl. No.: 804,422

[22] Filed: Dec. 4, 1985

[30] Foreign Application Priority Data

Dec. 5, 1984 [JP] Japan ................. 59-256918

[51] Int. Cl.⁴ ............. B25J 9/06; B25J 19/06
[52] U.S. Cl. .................... 414/730; 318/634; 901/9; 901/46; 901/50
[58] Field of Search ........ 414/730; 901/9, 46, 901/48, 50; 364/513; 318/632, 634

[56] References Cited
U.S. PATENT DOCUMENTS
4,530,062  7/1985  Inaba et al. ............... 901/48 X FOREIGN PATENT DOCUMENTS
55-21362  9/1980  Japan .

Primary Examiner—Robert J. Spar
Assistant Examiner—P. McCoy Smith
Attorney, Agent, or Firm—Sughrue, Mion, Zinn, Macpeak & Seas

[57] ABSTRACT

In an industrial robot system, the robot is first moved to a starting position, and, when the temperature of the robot exceeds a predetermined value, a position checking operation is effected to move the robot towards the starting position so that, according to the difference between the starting position and the position where the robot has been stopped by the position checking operation, a compensation value is provided for temperature compensation of the robot, whereby, even when the working arms of the robot are extended or contracted by temperature variations, the robot can perform its working operation correctly.

7 Claims, 11 Drawing Figures

4,668,157

INDUSTRIAL ROBOT SYSTEM

BACKGROUND OF THE INVENTION

The present invention relates to industrial robot systems, and more particularly to a device for preventing an industrial robot system from operating abnormally due to factors such as variations in temperature.

An example of an industrial robot system operating in response to a prestored program is disclosed in Japanese Patent Publication No. 21362/1980. A conventional industrial robor system similar to that system will be described with reference to FIGS. 1 and 2.

In these figures, reference numeral 1 designates a first conveyor for supplying workpieces 2. A second conveyor 3, laid parallel to the first conveyor 1, supplys boxes 4. A third conveyor 5 crosses the first and second conveyors 1 and 3 at their ends; and a robot 6 is installed near the end of the third conveyor 5, and has a working range extending to the ends of the first and third conveyors 1 and 5.

In FIG. 2, 6a designates the base of the robot 6. A lifting mechanism 6b is installed on the base 6a and has an electric motor 6c. A first working body 6d is driven by the lifting mechanism 6b and has a lifting shaft which is lifted while being supported by the base 6a. A turning mechanism 6e is provided at the end of the first working body 6d and is energized by an electric motor. A second working body 6f includes an arm secured at one end to the turning mechanism 6e, for performing a turning operation. A turning mechanism 6g is provided at the free end of the second working body 6f and is energized by an electric motor. A third working body 6h has an arm secured at one end to the turning mechanism 6g, for performing a turning operation. A turning mechanism 6i provided at the free end of the third working body 6 and is energized by an electric motor. A gripping device 6j is secured to the operating part of the turning mechanism 6i. A control device 7 is provided for the robot 6.

The robot is controlled by the control device 7 according to a prestored program, whereby the first through third working bodies 6d, 6f and 6h perform their working operations with the aid of the lifting mechanism 6b and the turning mechanisms 6e and 6g, respectively, and the gripping device 6j conducts its working operation with the aid of the turning mechanism 6i, so that the workpieces 2 supplied by the first conveyor 1 are put in the box 4 supplied by the second conveyor 3. The box 4 containing the workpieces 2 is conveyed by the third conveyor 5.

In this industrial robot system, after the robot starts its operation, the electric motor for the turning mechanisms generate heat, causing the various working bodies to expand. Hence, since the control of the turning operations is based on turning angles, errors are caused in the working operation positions of the working bodies, with the result that the operation of the robot becomes inaccurate.

SUMMARY OF THE INVENTION

Accordingly, an object of the invention is to eliminate the above-described difficulty accompanying a conventional industrial robot system.

More specifically, an object of the invention is to provide an industrial robot system in which the working operation position errors of the robot due to temperature changes are automatically corrected.

The foregoing object and other objects of the invention have been achieved by the provision of an industrial robot system which, according to the invention, comprises: a robot having working bodies which are operated under the control of a control device; starting operation means for moving, in response to a start instruction, the working bodies to predetermined starting positions with the aid of the control device; temperature detecting devices which operate when the temperature of the operating robot exceeds a predetermined value; position checking operation means which is energized by the operations of the temperature detecting devices to move the working bodies to the starting positions with the aid of the control device; a position detecting device for providing an output according to the differences between the starting positions and the positions where the working bodies are stopped by the position checking operation means; and temperature compensating means for providing a compensation value according to the output of the position detecting device to operate the working bodies with the aid of the control device.

The nature, utility and principle of the invention will be more clearly understood from the following detailed description and the appended claim when read with reference to the accompanying drawings:

DESCRIPTION OF THE PREFERRED EMBODIMENTS

A preferred embodiment of the invention will be described with reference to FIGS. 3 through 10.

Figure 1:
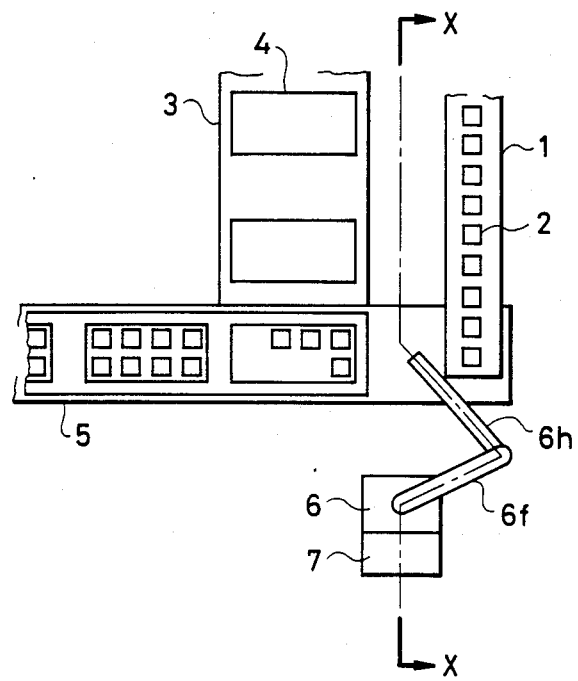
FIG. 1 is an explanatory diagram showing a conventional industrial robot system.
Figure 2:
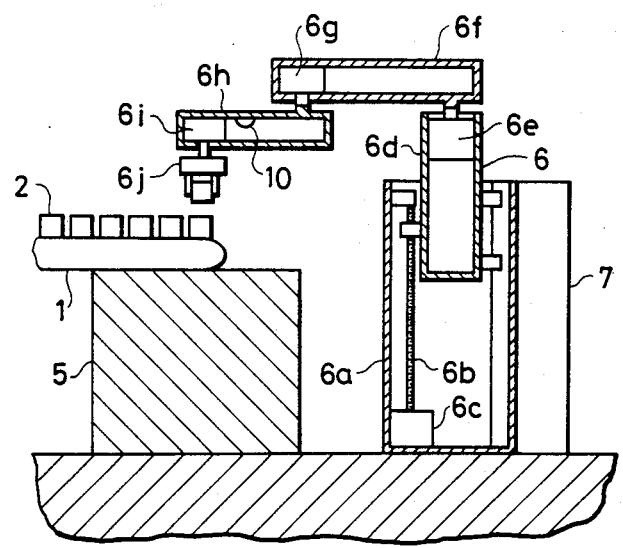
FIG. 2 is a sectional view taken along a line X—X in FIG. 1.
Figure 3:
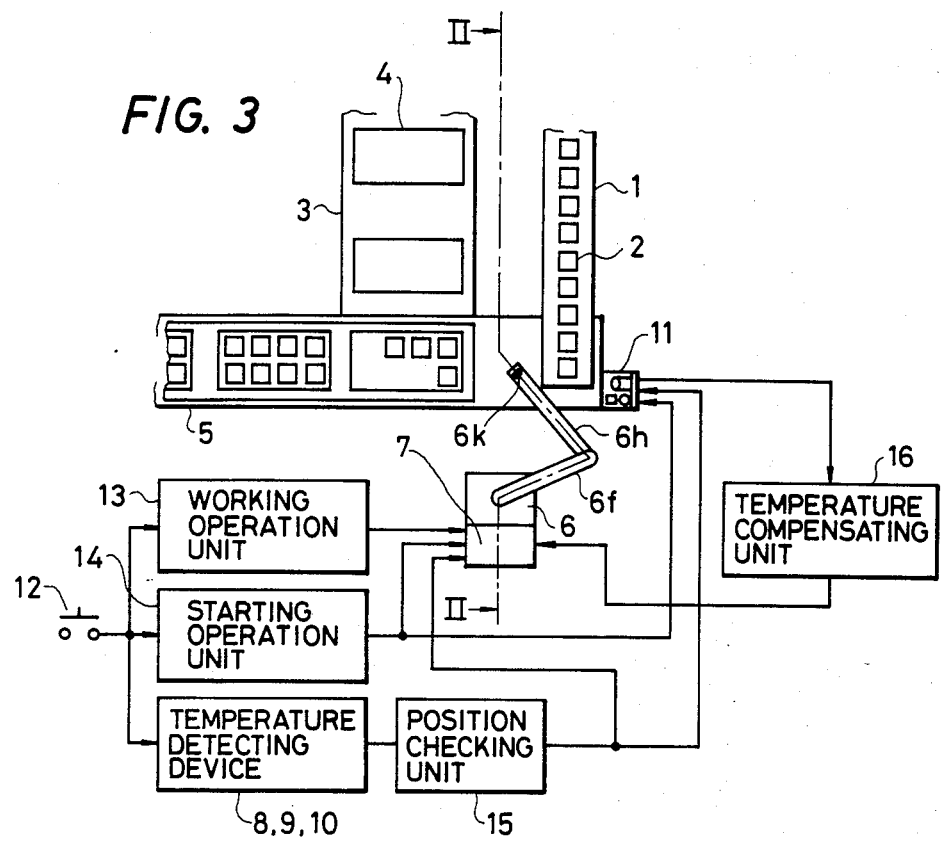
FIG. 3 is an explanatory diagram showing the overall arrangement of an example of an industrial robot system according to this invention.

In these figures, parts corresponding functionally to those already described with reference to FIGS. 1 and 2 are designated by corresponding reference numerals or characters.

Further in FIGS. 3 through 10, 6k designates a protrusion provided on the upper surface of the free end of the third working body 6f. A third temperature detecting device 10 is provided on the third working body. A position detecting device 11 is provided near the end of the first conveyor 1. A first detector 11a includes a measuring gauge arranged so that its operating direction is horizontal in FIG. 3. A second detector 11b includes a measuring gauge arranged so that its operating direction is vertical in FIG. 1; and, a third detector 11c includes a measuring gauge arranged so that its operating direction is vertical.

Further in these figures, reference numeral 12 designates a start instruction unit including a start switch. A working operation unit 13 includes a program used to cause the robot to perform its working operations with the aid of the control device 7. A starting operation unit 14 includes a program for causing the robot 6 to move towards the position detecting device 11 and to stop at a predetermined position. A position checking operation unit 15 includes a program which, when the temperature of the robot 6 exceeds a predetermined value, moves the robot towards the position detecting device 11 with the aid of the operations of the first through third temperature detecting devices 8 through 10 and stops it at that position. A temperature compensating unit 16 includes a program for providing a correction value according to the output of the position detecting device 11 which corresponds to the difference between the position where the robot 6 is stopped through the position checking operation and the predetermined position where the robot is stopped through the starting operation, to thereby subject the robot to temperature compensation. A computer 17 in the control device 7 includes a CPU 18, a RAM 19 and a ROM 20. Numeral 21 designates an I/O port, while numerals 22 and 23 respectively denote a control unit for the robot 6 and a drive unit such as the motor 6c for the robot 6.

Figure 10:
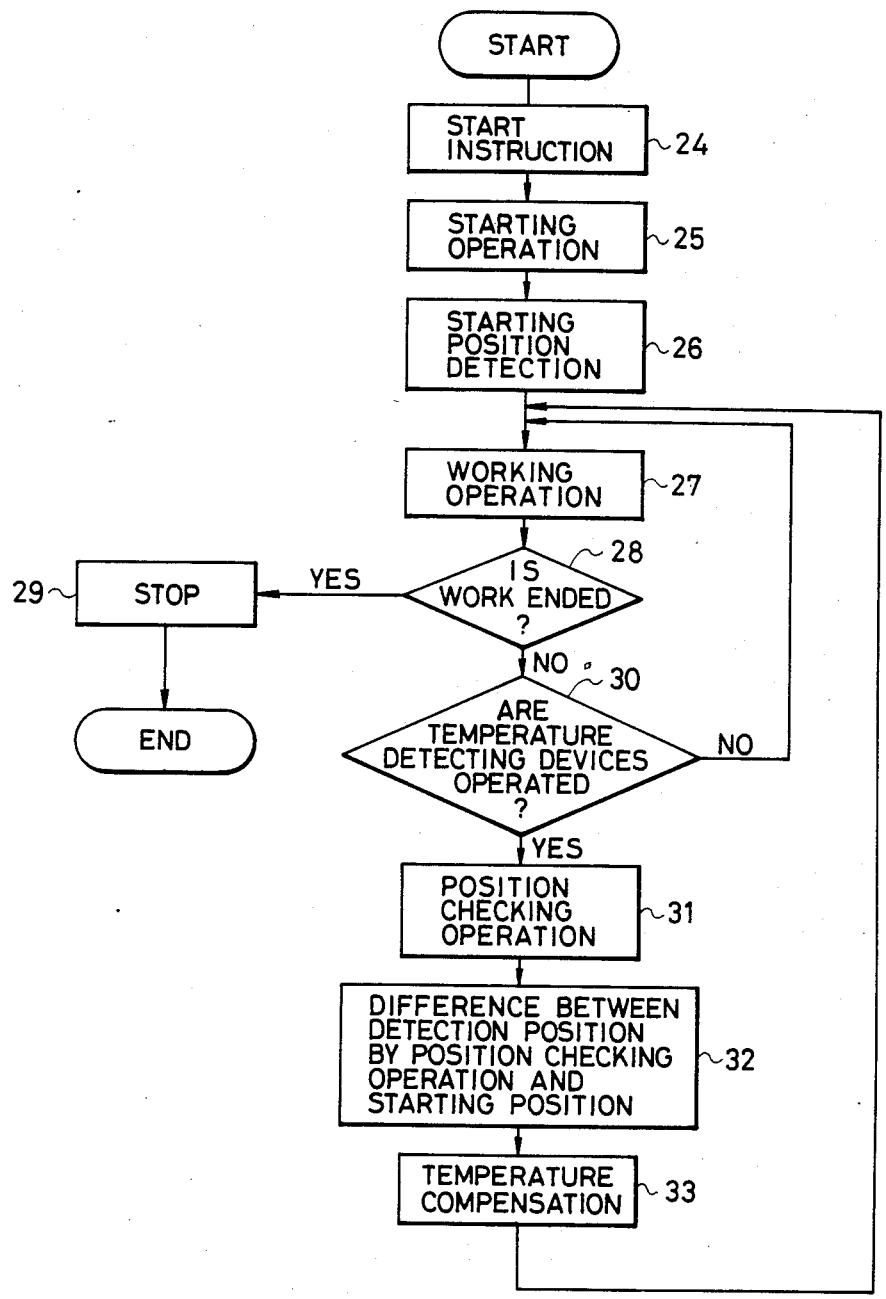
FIG. 10 is a flow chart for a description of the operation of the industrial robot system in FIG. 3.

The operation of the industrial robot system thus arranged will be described with reference to the flow chart of FIG. 10.

Figure 5:
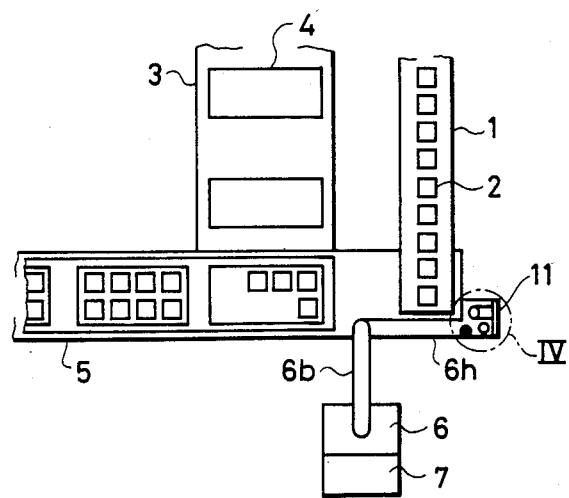
FIG. 5 is an explanatory diagram showing an operation of a robot of FIG. 3.
Figure 6:
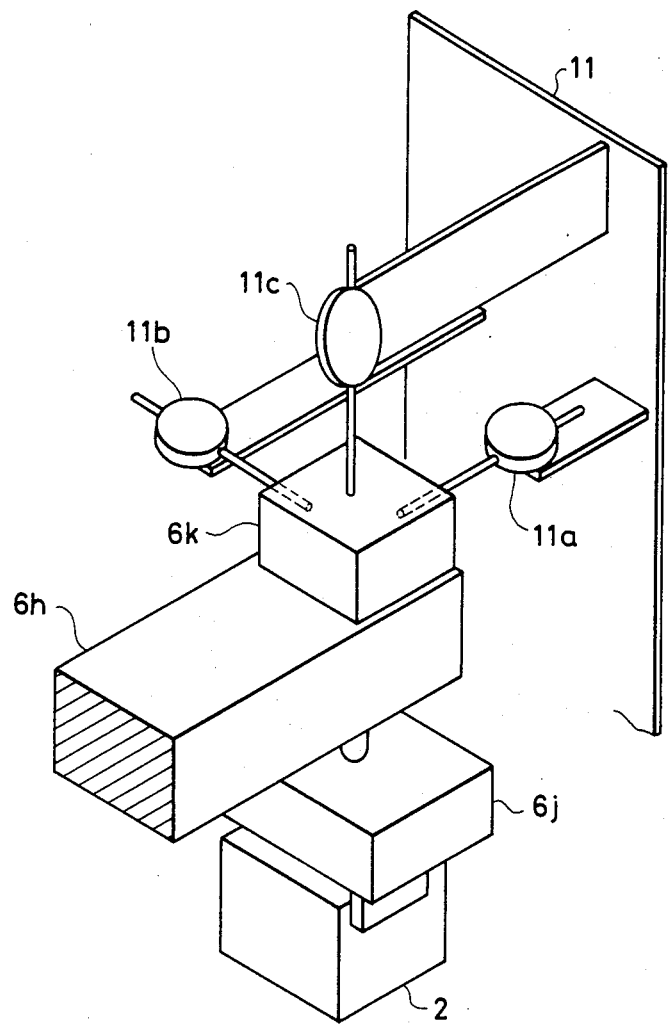
FIG. 6 is an enlarged perspective view of a part IV in FIG. 5.
Figure 7:
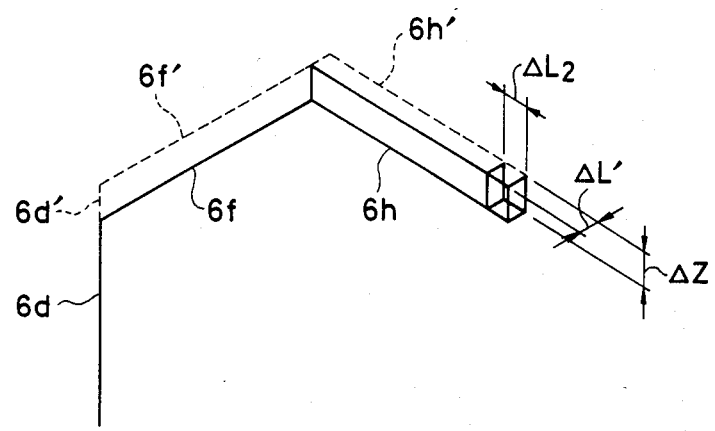
FIG. 7 is a perspective view showing variations in dimensions of the working bodies of the robot caused by temperature changes.

When the operator operates the start instruction unit 12, in Step 24, the start instruction is issued to start the robot 6. As a result, the starting operation unit 14 actuates the control unit 22 and the drive unit 23 through the control device 7 so that the first through third working bodies 6d, 6f and 6h of the robot 6 perform their starting operations to move to their starting positions in Step 24. That is, as shown in FIG. 5, the second and third working bodies 6f and 6h are maintained stopped in such a manner that the second working body 6f is moved along the Y axis in FIG. 8, while the third working body 6h is moved along the X axis in FIG. 8. As a result, the first, second and third detectors 11a, 11b and 11c of the position detecting device 11 are depressed by the protrusion 6k of the third working body 6h, whereby, in Step 26, starting position detection is carried out and the positions are stored in the computer 17. In succession, the working operation unit 13 operates the control device 7 so that the robot 6 performs the working operation in Step 17.

Figure 8:
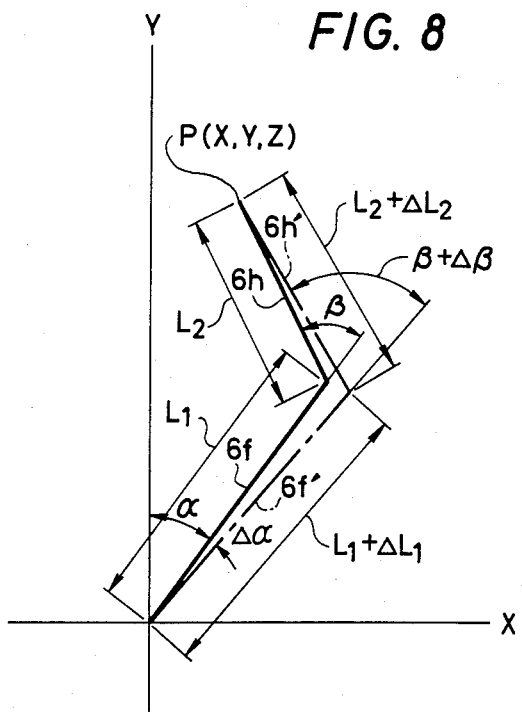
FIG. 8 is a diagram for a description of a working operation instruction for the robot of FIG. 3.
Figure 9:
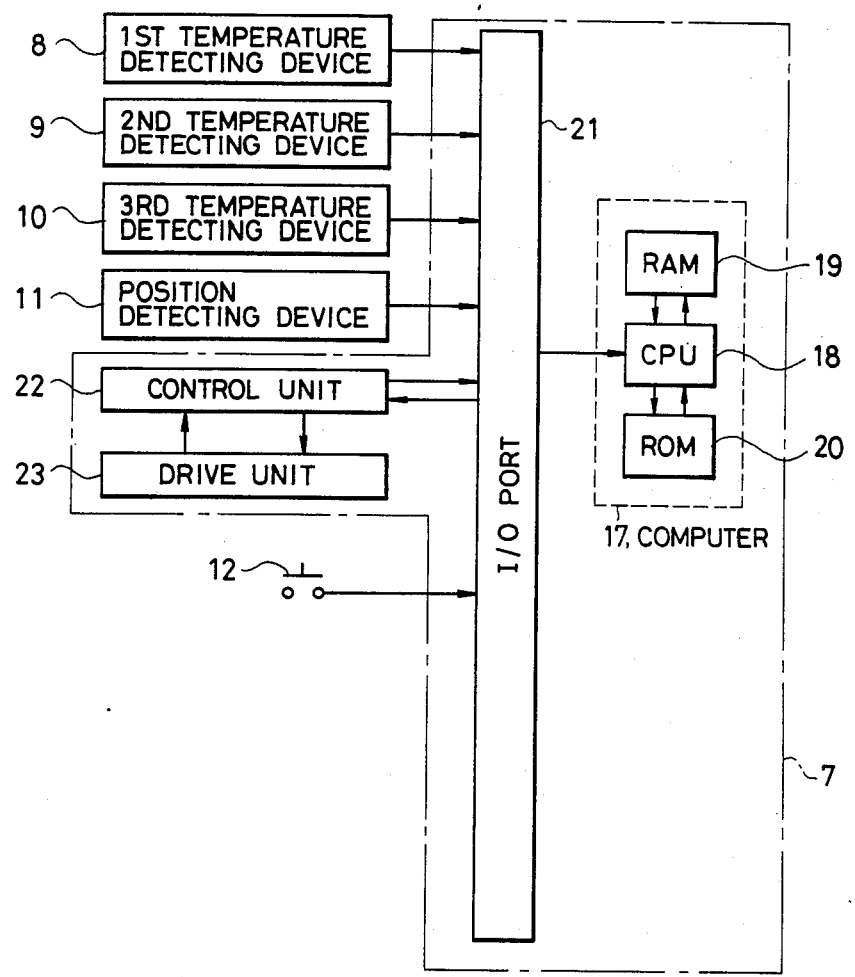
FIG. 9 is a block diagram showing electrical connections of the devices in FIG. 3.

In this operation, the following control functions are carried out:

In order to move the robot 6 to a point P (the coordinates X, Y, Z) in FIG. 8, for instance, the robot 6 is controlled so that angles $\alpha$ and $\beta$ satisfying the following expressions are formed:

$$X = L_1 \sin \alpha - L_2 \sin (\beta - \alpha), \quad (1)$$

$$Y = L_1 \cos \alpha + L_2 \cos (\beta - \alpha), \text{ and } Z = Z_1, \quad (2)$$

where $L_1$ is the length of the second working body, $L_2$ is the length of the third working body, $Z_1$ is the height of the first working body 6d from a reference position, $\alpha$ is the angle between the Y axis and the second working body, and $\beta$ is the angle between a line extending from the second working body 6f, and the third working body 6h.

If, in Step 28, the work is ended, then the robot 29 is stopped. On the other hand, if the work is not ended in Step 28, and the first, second and third temperature detecting devices 8, 9 and 10 are not operated in Step 30, then the working operation in Step 27 is performed again. When the temperatures of the first, second and third working bodies 6d, 6f and 6k exceed the predetermined values, for instance, because of the operation of the electric motor 6c, and the first through third temperature detecting devices 8 through 10 operate, then the positio checking operation unit 15 operates the control device 7 to perform the position checking operation of the robot 6 in Step 31. As a result, the robot 6 is stopped at the position determined by the position detecting device 11, and the elongation $\Delta Z$ of the first working body 6d' due to the increased temperature, the elongation $\Delta L_1$ of the second working body 6f' due to the increased temperature, and the elongation $\Delta L_2$ of the third working operation unit 13 are corrected as described below:

In order to move the robot 6 to a point P indicated in FIG. 8, for instance, the robot 6 is controlled so that angles $\alpha + \Delta\alpha$ and $\beta + \Delta\beta$ and a value Z which satisfy the following expressions are formed:

$$X = (L_1 + \Delta L_1) \times \sin (\alpha + \Delta\alpha) - (L_2 + \Delta L_2) \times \sin (\beta + \Delta\beta - \alpha - \Delta\alpha), \quad (4)$$

$$Y = (L_1 + \Delta L_1) \times \cos (\alpha + \Delta\alpha) + (L_2 + \Delta L_2) \times \cos (\beta + \Delta\Theta - \alpha - \Delta\alpha), \text{ and} \quad (5)$$

$$Z = Z_1 - \Delta Z, \quad (6)$$

where $\Delta\alpha$ is the increment in angle, with respect to the Y axis, of the second working body 6f at the increased temperature, and $\Delta\beta$ is the increment of the angle between the second and third working bodies 6f and 6h', also at increased temperatures.

The working operation of Step 27 is repeatedly carried out by the temperature compensating unit 16. Thus, the positional errors of the robot 6 due to the elongation of the various members thereof are automatically corrected. Therefore, the industrial robot system of the invention is positive in operation and high in reliability.

The correction of the positional errors of the robot 6 caused when the temperature increases has been described with reference to FIGS. 3 through 10. Even in the case though where the temperature of the robot 6 is decreased owing to ambient changes or the like, temperature compensation can still be readily effected so as to maintain the correct operation of the robot.

Furthermore, in the above-described embodiment, the first through third temperature detecting devices 8 through 10 are provided for the first through third working bodies 6d, 6f and 6h, and the position detecting device 11 detects the differences in length of the working bodies 6d, 6f and 5h, and the position detecting device 11 detects the differences in length of the working bodies caused by temperature variations. Therefore, temperature compensation can be suitably effected according to the differences in lengths of the working bodies 6d, 6f and 6h; that is, the correct working operation can be readily obtained when the temperature of the robot changes. The temperatures of the first, second and third working bodies 6d, 6f and 6h may of course be different values during operation.

Figure 11:
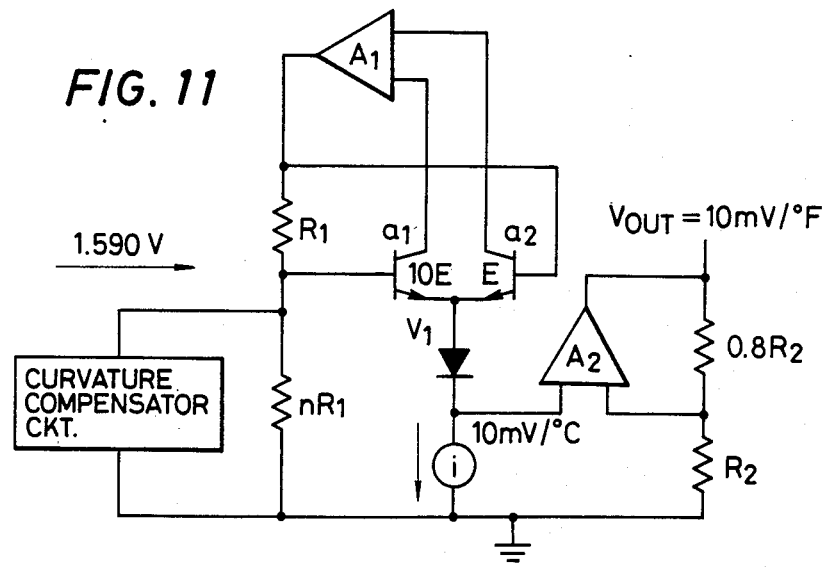
FIG. 11 is a schematic diagram of temperature detecting units which may be used in the invention.
Figure 4:
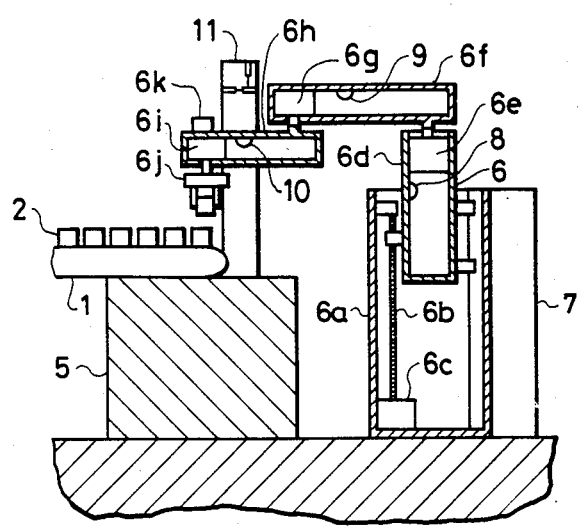
FIG. 4 is a sectional view taken along a line II—II in FIG. 1.

An example of a suitable circuit for the temperature detecting devices is shown in FIG. 11.

As is apparent from the above description, at its start, the robot is moved to the starting position, and when the temperature of the robot exceeds the predetermined value, the position checking operation is carried out so as to move the robot towards the starting position. According to the difference between the position where the robot is stopped by the position checking operation and the starting position, the content of the working operation unit is compensated by the temperature compensating unit. Therefore, the working position error caused by the extension or contraction of the working bodies due to temperature variations of the robot is automatically corrected. Thus, the industrial robot system of the invention is positive in operation and high in reliability.

We claim:

1. An industrial robot system comprising:
    a robot having working bodies operated under the control of a control device;
    starting operation means for moving, in response to a start instruction, said working bodies to predetermined starting positions with the aid of said control device;
    temperature detecting devices which operate when the temperature of said robot, after said robot has been started, exceeds respective predetermined values;
    position checking operation means energized by operations of said temperature detecting devices to move said working bodies to reference positions with the aid of said control device, said reference positions corresponding identically to said starting positions but for at least dimensional changes induced as a result of temperature changes;
    a position detecting device for providing an output according to the differences between said starting positions and said reference positions where said working bodies are stopped by said position checking operation means; and
    temperature compensating means for providing a compensation value according to said output of said position detecting device to operate said working bodies with the aid of said control device.

2. An industrial robot system as claimed in claim 1, further comprising a position measuring device for measuring the position of said working bodies at their starting positions, said starting operation means being adapted to send to said control device signals from said position measuring device upon measurement of said starting positions of said working bodies.

3. An industrial robot system as claimed in claim 2, wherein said working bodies are provided with protrusions, said protrusions confronting said position measuring device at said starting positions of said working bodies, said position measuring device measuring the positions of said working bodies via said protrusions.

4. An industrial robot system as claimed in claim 2, wherein said position measuring device measures the positions of said working bodies in three perpendicualr directions.

5. An industrial robot system as claimed in claim 1, wherein said working bodies each comprise a plurality of members, each of said members being relatively movable, said temperature detecting devices being disposed on each of said members.

6. An industrial robot system as claimed in claim 5, wherein said position checking operation means moves said working bodies toward said reference positions when one of said temperature detecting devices detects a temperature exceeding a predetermined level.

7. An industrial robot system as claimed in claim 1, wherein said position detecting device comprises a position measuring device which measured the positions of said working bodies at their starting positions upon actuation of said starting operation means.

* * * * *